Sept. 2, 1969             P. WEBER             3,465,232

POWER SUPPLY UNIT WITH SHIELDED TRANSFORMER

Filed March 20, 1967             2 Sheets-Sheet 1

INVENTOR:
Paul Weber

John Stan
AGENT

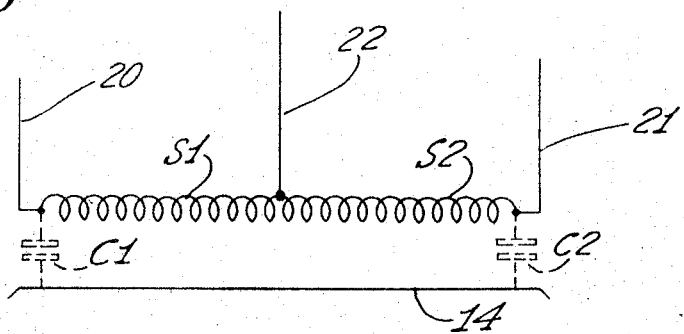
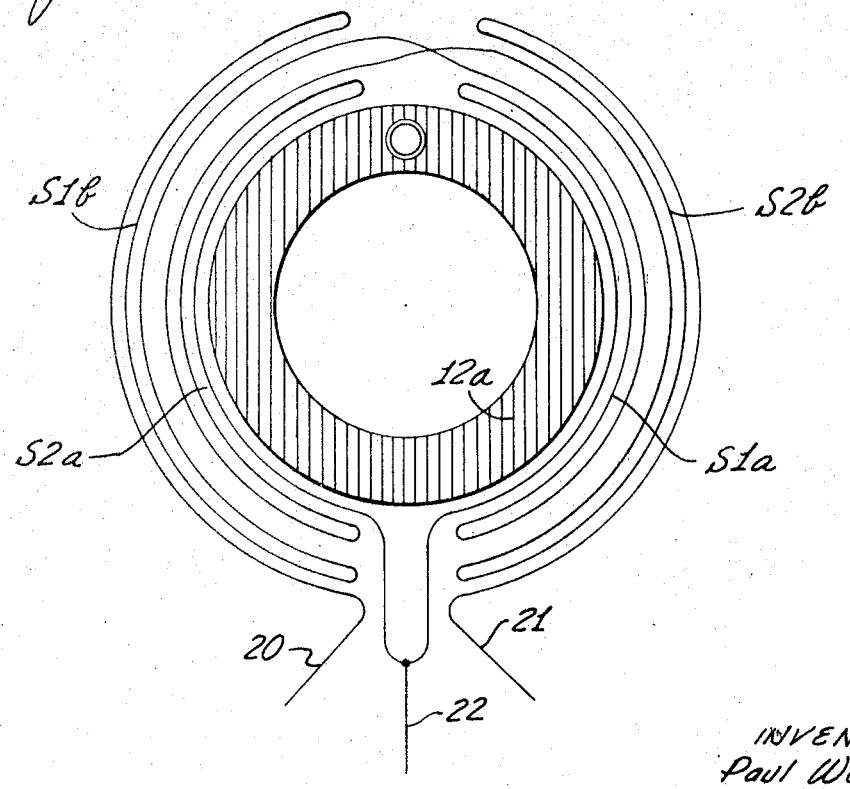

United States Patent Office 3,465,232
Patented Sept. 2, 1969

3,465,232
POWER SUPPLY UNIT WITH SHIELDED TRANSFORMER
Paul Weber, Freiburg im Breisgau, Germany, assignor to Fritz Hellige & Co., G.m.b.H., Freiburg im Breisgau, Germany
Filed Mar. 20, 1967, Ser. No. 624,290
Claims priority, application Germany, Mar. 25, 1966, H 58,903
Int. Cl. H02m 7/04
U.S. Cl. 321—8                    2 Claims

ABSTRACT OF THE DISCLOSURE

Electrical apparatus comprising a power supply including a transformer, an ungrounded load, and connecting means, wherein the secondary winding of the transformer is divided by a center tap into first half and second half sections each having a plurality of succeeding lengths which are alternately mounted to the core of the transformer so that each alternating succeeding length of the respective first and second half sections from said center tap are alternately mounted on opposite halves of the core, the center tap is at a floating zero reference potential, and the power supply is connected to the ungrounded load via connecting means and the power supply and the ungrounded load are maintained at the floating zero reference potential of the center tap.

BACKGROUND OF THE INVENTION

The present invention relates to power supply units for ungrounded utilization devices, especially for amplifiers which amplify weak voltages, for instance amplifiers for electrocardiographs and electroencephalographs.

Two considerations are of paramount importance for the medical equipment mentioned above. First, safety of contact is required for the equipment to prevent insulation breakdown of the instrument, when used in medical diagnostics, from becoming sources of danger to the service staff or patient. Insulated equipment having a high voltage insulation breakdown, located between the power supply unit and the instrument, say an amplifier, to which it is connected, meet this requirement, insofar as prevention of damage to the instrument itself by insulation breakdown is involved. However, in the event of a simultaneous contact of a different piece of equipment, that is, a piece of equipment unrelated to the amplifier and its power supply, with defective insulation and of the amplifier, to avoid any current flow from the power supply lead through the defective equipment, through the body of the person touching the equipment and through the grounded housing of the amplifier, it is desirable to eliminate the conventional groundind connection, usually provided for interference shielding, i.e. shielding from stray voltages. In this respect, battery-operated amplifiers have an essential advantage over amplifiers operated from an alternating current power source, since they require no grounding.

Secondly, interference-free operation of the amplifier is desired, which means it is desirable to suppress interference, or stray, voltages set up by electrical fields in the object measured and stray voltages caused by capacitive coupling to elements of the power supply. Both types of voltages cause an interference current in the object measured, and thereby an interference voltage having a magnitude proportional to the product of its intensity and the internal impedance of the object, which interference voltage is superimposed upon the desired signal.

If the amplifier were battery-operated, the interference effect, caused by this unrelated equipment, would be increased by grounding the neutral point, because the interference current supplied by the leads from the alternating current (AC) power source through the coupling capacitance to the measured object, and from there to ground, would encounter decreased resistance, because of the grounding connection, and therewith the interference current and, therefore, interference voltages in the measured object would increase. On the other hand, conditions are different in an amplifier fed from an AC power supply, and in this case a ground connection would be desirable in order to by-pass the interference current generated by capacitive coupling from the AC power supply leads to the amplifier housing.

The use of an electrostatic shield connected to the neutral of the power supply and placed around the primary of the power supply transformer to avoid interference from the stray coupling to the connection to the AC power is well known in the prior art.

BRIEF DESCRIPTION OF THE DRAWINGS

The novel features which are believed to be characteristic of the invention both as to its organization and method of construction and operation, together with further objects and advantages thereof, will be better understood from the following description, considered in connection with the accompanying drawings, in which one illustrative embodiment of the invention is disclosed by way of example. It is to be expressly understood that the drawings are for the purposes of illustration and description only and do not constitute a limitation of the invention.

In the drawings:
FIGURE 1 is a schematic circuit diagram showing an alternating current power supply unit of the prior art, which supplies direct current power to a utilization device, for example an amplifier, which in turn is connected to an object, in this case, a patient, which is a source of signals;

FIGURE 2 is a circuit diagram of a power supply unit in accordance with this invention, showing the connections of the power supply unit to the amplifier, especially the connections of the power supply transformer secondary windings;

FIGURE 3 is a schematic illustration of distribution of capacitance between the secondary winding and the shield, to show how the system of FIGURE 2 attains self-balancing, or symmetrization; and FIGURE 4 is a diagrammatical illustration of the arrangement of the successive turns of the secondary winding of a power supply transformer of FIGURE 2, having a toroidal, or ring-like, core.

DESCRIPTION OF THE PRIOR ART

Referring to FIGURE 1, which shows a power supply of the prior art, the object being measured, for instance a patient 1 in the case of electrocardiographs, is connected through body electrodes and wires 4 and 5 to the input of the amplifier 7. This amplifier transmits the amplified signals to the indicating or recording instrument 8.

Power is fed to the amplifier 7 from the AC power source 13 through a power supply unit 2, wherein the primary winding P of the power supply transformer 12 is shielded from the secondary winding S and the other electronic elements by a conductive shield 14, connected to the ground lead of the AC power source. One end of the secondary winding S is connected to the cathode of a rectifier 15 and the other end to one terminal of smoothing capacitor 16. The plate of the rectifier 15 is connected to the other terminal of the capacitor 16. The operating DC voltage is taken across the terminals of the capacitor 16.

Metal housing 4a enclosing the amplifier 7 and metal housing 4b enclosing power supply 2, together with one input electrode 4 to the amplifier 7, are connected together, forming what is termed herein the "amplifier zero reference potential," or simply, the "zero reference potential." Input electrode 4 is not connected to ground 10.

The capacitance to ground of the measured object 1 is designated as Cm and that of the amplifier housing 4a as Cv.

Although shield 14 prevents AC coupling between the primary P of the transformer and the amplifier housing 4a and therefore to the amplifier zero reference potential, there remains a little-known effect due to the secondary winding S which is often misunderstood. The fact is that there still remains an itnerference circuit, in which the secondary winding S may be considered as a source of AC voltage which continues through the coupling capacitance CS between the secondary winding S and shield 14, through ground wire 13b, through ground 10, through coupling capacitance Cm between the measured object 1 and housings 4a and 4b, and back to the secondary winding S. The interference current divides between the impedance path including Cm and the path including Cv in a ratio which is proportional to the ratio of their individual capacitances. The voltage drop across the coupling capacitance Cm, has the same effect as an AC voltage drop across the object, as it is amplified by the amplifier 7.

In the present state of the art, attempts have been made to eliminate this rseidual interference effect by means of a second shield connected to the amplifier zero reference potential and located between the secondary winding S and the primary shield 14. The effect is equivalent to placing a short-circuit across the coupling capacitance CS, making capacitance CS ineffective for transmitting an interference voltage. Then, the amplifier 7 can be operated free from interference without the necessity of grounding it. Similarly, other unwanted coupling capacitances between elements can be suppressed by shielding, in a manner known in the prior art.

SUMMARY OF THE INVENTION

The object of this invention is, not only to satisfy the main requirements recited hereinabove, but also to simplify the expensive shielding, which is also subject to trouble, of components present in the prior art. The fact is that, with double shielding of the power supply transformer, as is done in the prior art, there is the danger of a short-circuit between the two shields or between either of them and either of the windings.

According to one important feature of the invention, and to satisfy the requirements enumerated above, elements of the power supply unit for the electronic equipment, which are exposed to undesirable AC coupling from the secondary winding, are arranged, or laid out, symmetrically with respect to ground, wherever the capacitive coupling of these elements to the point of zero reference potential of the power supply is appreciable. This symmetrical arrangement is feasible particularly in the case of the secondary winding of the power supply transformer.

Thus, this feature of the invention may be formulated as relating to a transformer, particularly useful for power supplies, comprising a center-tapped secondary winding subdivided into sections, the sections being arranged in electrical symmetry with respect to the center tap. Suitably, each of two of the sections of the secondary winding, which are electrically at opposite sides from the center tap and at equal electrical distance from the center tap, are mounted in mutual physical vicinity, in the following manner.

Since the secondary winding S has a center tap, it is divided into two halves by the center tap. Each half is then subdivided into sections. That half which would normally, i.e. in accordance wtih prior art, be wound on one leg of the transformer core comprises those sections which are designated as S1a, S1b, S1c, . . . etc., and the other half of the winding which would normally be wound on the other leg of the core comprises those sections which are designated as S2a, S2b, S2c, . . . etc. The sections of which the designation includes the numeral "1" are electrically at one side from the center tap 22, and those sections of which the designation includes the numeral "2" are at the opposite side from the center tap. Any section pertaining to a pair of sections of which the designation includes the same lower case letter, such as a or b, is at the same electrical distance from the center tap as the corresponding section with the same letter in its designation. One of each of two sections of any such pair is wound at the opposite side of the center tap, suitably one section pertaining to one half of the secondary winding on top of one section pertaining to the other half of the secondary winding, however upon the same leg, or half, of the core, so as to result in equal compacitive coupling from the center tap 22 to the shield 14.

Thus, according to one embodiment of this invention, the section of at least one layer, generally more layers, S1a would have over it the section of layers S2b on one and the same leg of the transformer core, while the section of layers S2a would have wound over it the section of layers S1b on the other leg of the transformer core. This arrangement is shown schematically in FIGURE 2.

If the secondary winding consists of more sections of winding layers, the winding sequences on one leg would be S1a, S2b, S1c, S2d, . . . etc., and on the other leg, S2a, S1b, S2c, S1d, . . . etc.

DESCRIPTION OF THE PREFERRED EMBODIMENT

Referring now to FIGURE 2, one embodiment of the power supply unit of this invention includes a transformer 12 with a center-tapped secondary winding S, which feeds a full-wave rectifier circuit 15a which includes four diodes (not shown). At the output of the rectifier, that is, at the input to amplifier 7, there is located a filter capacitor 16, or several such capacitors, to smooth out the pulsations of the rectified current.

The primary winding P is connected to the "hot," or ungrounded, wire 13a and the grounded wire 13b of the AC power source 13, the transformer core being indicated diagrammatically as 12a. A conductive shield 14 surrounding the primary winding P suppresses interference voltages which might be caused by capacitive coupling between the primary circuit and the amplifier housing 4a. Amplifier housing 4a is at the same potential, i.e. the zero reference potential, as power supply housing 4b. The shield 14 is connected by branch conductor 19 to the grounded lead 13b of the AC power source. A changeover switch 18, connectable to lead 17a or 17b, serves to determine the grounded wire 13b of the AC power source. It is to be noted that the zero reference point is not grounded.

In order to solve the problem originating from this lack of ground connection, i.e. to eliminate interference voltages which are due to capacitive coupling between the current input leads of the amplifier 7 and ground 10, the secondary winding S is designed symmetrically with respect to ground, resulting in the capacitive coupling from the secondary winding to various elements, essentially the shield 14, as shown diagrammatically in FIGURE 3. In a one-layer secondary winding, symmetry or balance is assured inasmuch as the center tap 22, situated halfway between the two outer leads 20 and 21, is necessarily at zero potential because of the balanced capacitive coupling to the grounded shield 14, while both sides S1 and S2 of the secondary winding are wound symmetrically with respect to a plane through the center tap.

With the usual multilayer design, a geometrical and therewith capacitive symmetrization or balancing of the secondary winding S to shield 14 results when, according to one embodiment of the invention, the secondary winding has symmetrically arranged cross-connected turns, or generally sections, i.e. groups of turns, as shown diagrammatically in FIGURE 2. There are a number of ways for doing this, but in principle they can be exemplified by FIGURE 2, and, in practice, they may be schematically illustrated as shown in FIGURE 4.

Starting from the center tap 22, winding section, or group of turns, S1a is wound first over core 12, i.e. over the primary winding P (not shown in FIGURE 4) and over the shielding 14 surrounding the primary winding, in one or more layers in one winding direction. Then, immediately succeeding, winding sections, or groups of turns, S2a and S2b are wound in the opposite direction with respect to a plane of symmetry through center tap 22, with a corresponding number of layers. Then follows winding group of turns S1b as a continuation of winding member S1a, in the first-named direction of winding. This sequence of sections can be repeated several times, if required.

This arrangement assures the symmetry, or balance, both geometrical and capacitive, of the secondary winding halves with respect to shield 14 and, therewith, with respect to ground. In addition, it permits self-symmetrization within sufficient limits. If, as intended, the capacitances C1 and C2 of the winding halves, which may be viewed as located at the ends of the secondary winding adjacent the shield 14, are of equal magnitude, then of necessity no resultant AC voltage appears between the central tap 22 and shield 14. Referring now to FIGURE 3, if now, for instance, C2 were greater than C1, the no-voltage, i.e. the "cold," or neutral point would move slightly to the right-hand side to winding half S2. With respect to the center tap, the contribution of right-hand half winding to capacitance C1 would have decreased, but so would the total of the dynamic capacitance, thereby moving the neutral point back again to the central tap. Accordingly, the balanced condition so created compensates any unbalance, or dissymmetry, which could still prevail.

However, in order to achieve protection against voltage breakdown and for protective insulation in general, the entire transformer is dipped in a potting compound which makes it a rigid block and preserves the original symmetry or balanced conditions in general. Then, the arrangement according to this invention facilitates thorough impregnation with potting compound since there is no second shield between the two windings, as in the prior art. Since, as explained above, the interference or stray voltages due to capacitive coupling of the secondary winding halves with respect to shield 14 and ground are equal in magnitude and of opposite polarity, the center tap itself does not introduce any interference voltage. Also, the hum voltage at the lead or wire 4a at the zero reference potential of the amplifier is only half of the value of the hum voltage still remaining on smoothing capacitor 16, which voltage decreases as the capacitance of the capacitor 16 or the time constant of the discharge increases.

During the conducting phase of the rectifier bridge 15a, the symmetry or balance to ground ensured by the special distribution of windings with respect to the capacitively coupled interference voltages is not affected by the fact that forward resistances of the individual cells, or diodes, of bridge 15a are not quite equal, because in any case these differences amount to tenths of a volt. On the other hand, during the nonconducting phase, the back resistances of the rectifier cells, which may differ considerably, lead in general to an unbalance or dissymmetry with respect to ground to the applied alternating voltages. But during this nonconducting phase the fixed capacitor Cf acts as a shunt for the high-resistance, nonconducting rectifier cells, in effect connecting the wire 4a to the center tap 22 of the secondary winding S which is maintained at the zero reference potential. This ensures the balance, or symmetry, of the rectifier bridge with respect to ground, regardless of the phase of the AC current and irrespective of whether the diodes are perfectly matched. This symmetry and balance is true not only of the center tap connection but for the whole transformer because of the arrangement, or layout, of the secondary winding, as disclosed herein.

An important feature of the invention arises from the fact that, because both input leads to the amplifier 7 are floating, i.e. ungrounded, leads, it is immaterial to which of the two input current wires 23 or 4a the central tap 22 of the secondary winding S of the transformer is connected through fixed capacitor Cf. Similarly, the connection can be made to any other connecting point located on the load side of rectifier 15a, for instance, to a center tap of the smoothing capacitor 16. Although, in FIGURE 3, the smoothing capacitor is shown as one unit, it could consist of two capacitors in series across the output of the bridge circuit. Then, the point of junction of the two capacitors is the center tap of the two capacitors.

The particular winding arrangement of the transformer and layout of the power supply have the result that unbalanced or dissymmetrical voltages between the center tap of the power transformer and its grounding shield remain smaller by several orders of magnitudes than the total applied voltage at the secondary winding. For instance, with a peak-to-peak voltage of 250 volts, the interference, or stray, voltage remains under 1 volt, which applies naturally only when the shield 14 between the primary and secondary windings is connected to the ground AC power source wire 13b through the switch 18. But even with the switch 18 in a wrong position, there is no electrical continuity between the amplifier 7 and the measured object 1 connected to it, for example, in electrocardiographs, the patient, on the one hand, and the AC power source lead or a ground connection on the other hand, which assures complete operating safety.

Not only does elimination of a second statis shield between the primary and secondary windings of the power transformer simplify and facilitate basically the construction and potting of the transformer, but it also increases operating safety. For a piece of equipment to be considered protectively insulated, there must be a voltage breakdown resistance of 4 kv. between the AC power source leads and the utilization device or instrument, that is, between the primary P and the secondary winding S of the power transformer 12. With two shields, as is the case in the prior art, it would be extremely difficult to maintain the proper breakdown resistance and completely fill in the space between the two shields by the potting material, especially when the shielding must be completely hermetic, that is, without cracks or voids. On the other hand, if one shield is eliminated, as in accordance with this invention, then the potting compound can penetrate more easily the space on both sides of the single shield and into the intervening space between it and the windings, which assures high-strength insulation.

The elimination of interference, or stray, voltages and high-operating safety obtained by the arrangements of this invention are valuable advantages for the application of high-gain recording amplifiers, primarily for use in medical diagnostics.

What is claimed is:

1. Electrical apparatus comprising:

power supply means including a transformer having a core, a primary winding and a secondary winding with a single shield between, said secondary winding having a center tap, being at a floating zero reference potential, which divides said secondary winding into a first half section having a plurality of succeeding lengths and a second half section having a plurality of succeeding lengths, wherein said respective first half section and said second half section are electrically at opposite sides from said center tap and at equal electrical distances from said center tap, further wherein respective alternating succeeding lengths of said respective first half section and second half section are physically mounted on said core so that the first length of said first half section is on a first half of said core, the first length of said second half section is on the second half of said core, the second length of said first half section is on said first half of said core and over said first length of said second half section, the second length of said second half section is on said first half of said core and over said first length of said first half section, and each alternating succeeding length of said respective first and second half sections are mounted alternately on opposite sides of said core; an ungrounded load; and connecting means for connecting power supply means to said load and for maintaining said power supply means and said load means at said floating zero reference potential of said center tap.

2. Electrical apparatus as recited in claim 1, wherein said connecting means comprises rectifying means and a capacitor between said center tap and said rectifying means.

References Cited

UNITED STATES PATENTS

| | | | |
|---|---|---|---|
| 1,827,191 | 10/1931 | Casper | 336—69 |
| 2,272,452 | 2/1942 | Whittle | 336—69 X |
| 3,244,960 | 4/1966 | Stevens et al. | 321—8 |
| 3,286,153 | 11/1966 | Inose | 321—8 |

FOREIGN PATENTS

| | | |
|---|---|---|
| 203,997 | 9/1939 | Switzerland. |
| 376,817 | 7/1932 | Great Britain. |

JOHN F. COUCH, Primary Examiner

W. H. BEHA, JR., Assistant Examiner

U.S. Cl. X.R.

323—48; 336—69